May 2, 1933.   J. ROBINSON   1,906,919
AUTOMATIC TRAIN PIPE CONNECTER
Original Filed May 7, 1929
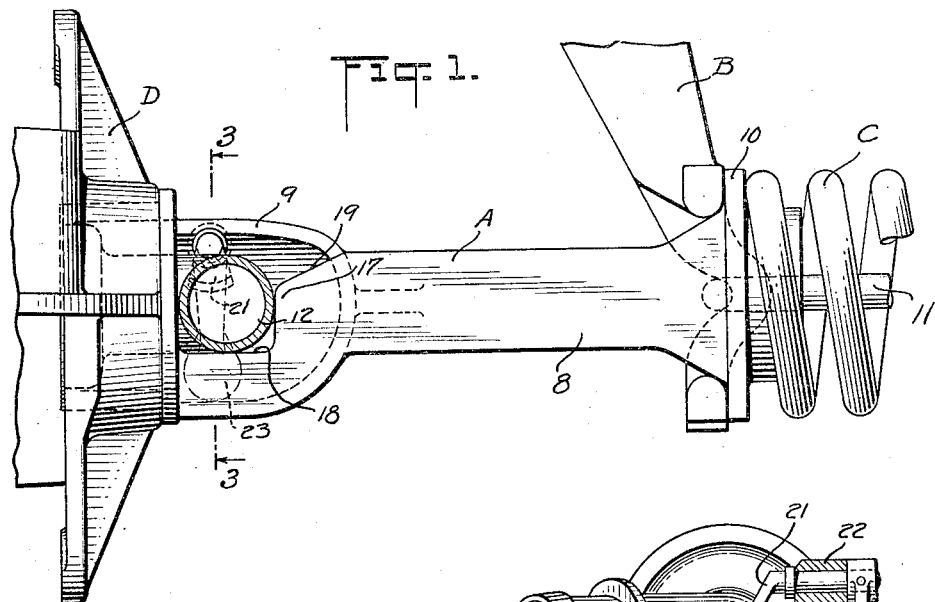
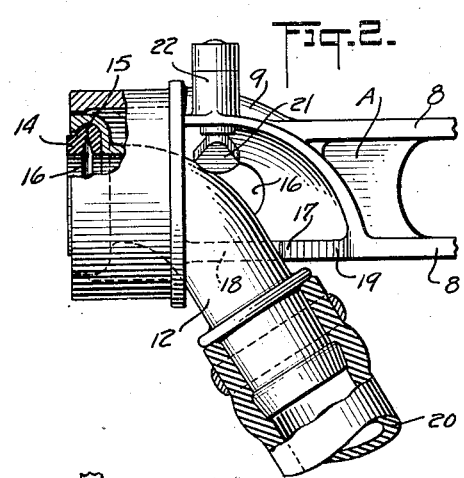
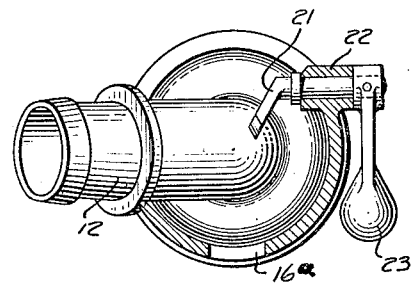
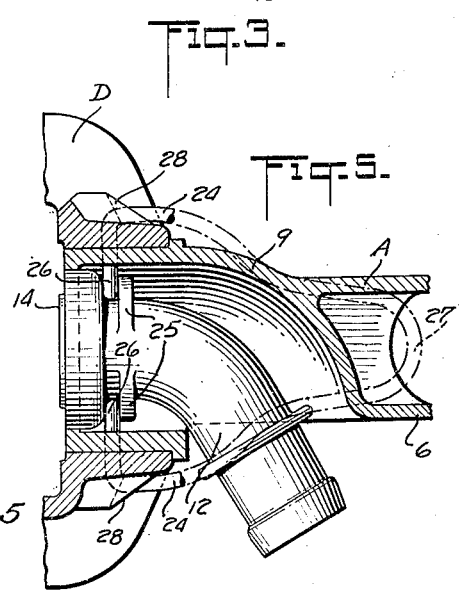
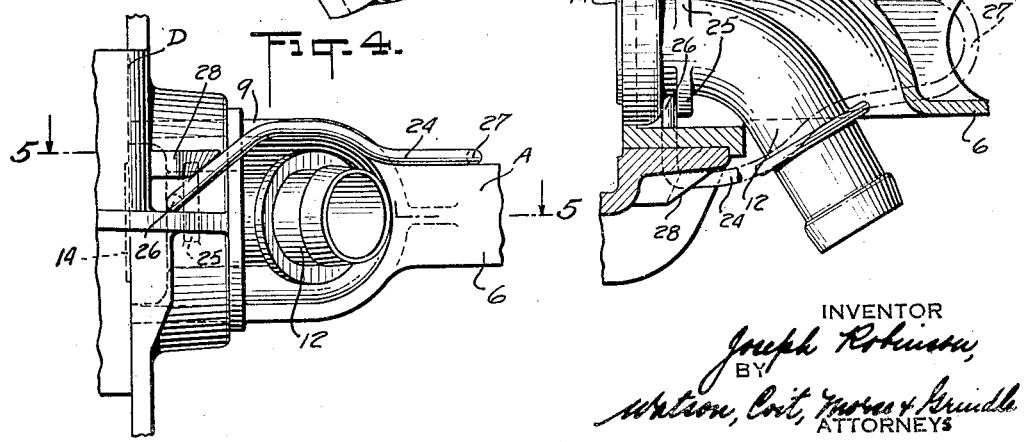
INVENTOR
Joseph Robinson,
BY
Watson, Coit, Moree & Grindle
ATTORNEYS Patented May 2, 1933

1,906,919

UNITED STATES PATENT OFFICE

JOSEPH ROBINSON, OF NEW YORK, N. Y.

AUTOMATIC TRAIN PIPE CONNECTER

Application filed May 7, 1929, Serial No. 361,142. Renewed September 22, 1932.

This invention relates to automatic train pipe connecters, and more particularly to means for renewing defective gaskets between the heads of such connecters without first uncoupling the heads. A construction of this character on which the present invention is an improvement is shown in my re-issue Patent #15,639, June 26th, 1923, for improvements in automatic train pipe connecters.

In the accompanying drawing

Figure 1 is a side elevation of a connecter embodying my improvement. Some of the parts in this view are broken away, and the rear portion of the conduit is shown in section;

Figure 2 is a plan view of the conduit and forward end of the supporting member shown in Figure 1. In this view the coupling head is omitted;

Figure 3 is a rear view of the arrangement shown in Figure 1 taken substantially on the line 3—3 of Figure 1. In this view the coupling head is also omitted;

Figure 4 is a side elevation of a modification of my improvement, and

Figure 5 is a sectional plan view on substantially the line 5—5 of Figure 4.

My improvement includes a supporting member A comprising spaced straps 8 which terminate at their forward end in an enlarged hollow end 9 and at their rear end in a flange or projection 10 which normally is held against the rear face of the bracket B by means of a compression spring C which is anchored to the bracket by the tie rod 11. It will be observed that the connection between the bracket and the tie rod 11 lies between the straps 8, see Figure 1. The forward end 9 of the member A is suitably connected to the coupling head D which latter may be of any design or type. I preferably press the front end of the member A into the head, though it may be bolted or riveted thereto if preferred. Within the hollow end 9 I mount a conduit 12 which has at its forward end a gasket 14. The gasket is mounted in an interior annular groove formed in the forward enlarged end of the conduit, and is provided with a flange 15 having an interior annular groove 16 for the reception of pressure fluid to expand the gasket into tight engagement with its seat in the conduit 12 and against an opposing gasket. The conduit extends laterally out of the hollow end 9 of the member A and suitably receives the customary train pipe hose, indicated at 20, Figure 2. The conduit 12 may be said to be hooked into the hollow end 9 and to occupy both the opening in the front face thereof and the lateral opening to which the shank of the conduit extends, see particularly Figures 1 and 2. An opening 16a is provided in the bottom of the enlarged end 9 of the member A to permit such foreign substance as might accumulate therein a way out, and thus keep the hollow end 9 free of obstructions.

To maintain the conduit 12 in the service position shown in Figures 1 and 2, I provide the member A with a rigid lock or shoulder 17. Or expressing it another way I provide an opening in the lateral side wall and preferably in the top of the forward end 9 of the member A, as shown in Figures 1 and 2, and I provide the member at one side with a slot or seat 18 which communicates with said opening and which is adapted to snugly receive the laterally extending portion of the conduit 12. An inclined surface 19 is formed on the member A as a lead to the seat or bearing 18. Collectively the seat 18 and the inclined surface 19 may be considered cam means for locking the conduit in place. When the conduit is in the service position shown in Figures 1 and 2 the tension of the train pipe hose 20 holds it firmly down in its seat 18 on member A and thus retains it in a locked position. To augment this natural locking effect of the hose 20 I throw across the path of the conduit 12, an eccentric lock or latch 21, mounted in the bearing 22 on the member A and normally held in the service position shown in Figures 1, 2 and 3 by a weighted handle, or other means, 23. When the handle is lifted the latch 21 moves out of the path of the conduit 12. This supplemental lock is not indispensible to the successful operation of my improvement, inasmuch as the tension of the hose 20, especially when under full air pressure, constantly draws the conduit 12 firmly down into its aforesaid seat. Wear between the conduit and the shoulder 17 of its seat 18 is compensated for by the expansible feature of the gasket 14, which arrangement automatically shifts the conduit rearwardly to compensate for any wear. To remove the conduit 12 it is but necessary to rotate the handle 23 upwardly to throw the latch 21 out of the path of the conduit, and then rotate the conduit itself upwardly and slip it out of the hollow end 9 of the member A along the inclined surface 19—this, of course, against the tension of the hose 20.

The modification of my improvement shown in Figures 4 and 5 consists in substituting for the aforesaid locking means for the conduit 12 a spring latch or tong 24 which spans the forward end 9 of the member A and passes through perforations therein into engagement with the rear side of the enlarged head of the conduit 12 as shown particularly in Figure 5. To prevent undue forward movement of the conduit 12 in this modified form of my invention I provide semi-annular rings or shoulders 25 on the conduit to engage with the inwardly extending fingers or projections 26 of the tong 24. To disengage the conduit from the head with this modified arrangement of my invention, a finger is hooked under the rear end 27 of the tong and the tong is lifted against the cammed surfaces 28 formed on the coupling head E, or on the member A, thus steadying the tong and withdrawing the fingers or projections 26 out of engagement with the conduit 12, whereupon the conduit may be readily removed from the hollow end 9 of the member A. The reverse of this operation will replace and lock the conduit in the member A.

What I claim is:

1. An automatic train pipe connecter comprising in combination, a coupling head and a supporting member therefor, the head having an opening there-through, a laterally diverging conduit removably mounted in said opening, and rigid means on said member for engaging the laterally diverging portion of said conduit, upon rotation of the conduit relative to the member, to lock the conduit in said opening.

2. An automatic train pipe connecter comprising in combination a coupling head, a member connected to the head and extending rearwardly thereof, said member at its front end having a hollow portion provided with a seat formed in the lateral wall thereof, a conduit removably mounted in said coupling head and said hollow portion and extending laterally out of the same and having a part arranged to engage said seat upon rotation of the conduit in said hollow portion, whereby the conduit is locked in place.

3. An automatic train pipe connecter comprising in combination, a coupling head and a supporting member therefor, said head being provided with an opening, a conduit removably mounted in said opening and adapted to be removed therefrom from the rear of said head, and a device projecting into the path of said conduit to lock the conduit in the head, said device, when rotated, being adapted to move out of engagement with said conduit to permit removal of the latter.

4. An automatic train pipe connecter comprising in combination, a coupling head and a supporting member therefor, said head having an opening, a conduit removably mounted in said opening and suitably connected with a train pipe hose, means rigid with respect to said head for locking said conduit in the head upon rotation of the conduit, and yieldable means tending normally to maintain said conduit in locked relation to said rigid means.

5. An automatic train pipe connecter comprising in combination, a coupling head having an opening, a supporting member connected to said head and extending rearwardly thereof and having a hollow front portion, said hollow portion having one of the lateral side walls thereof provided with an opening for receiving a conduit, said lateral side wall adjacent said opening being shaped to form a seat for receiving the conduit and holding the same against rearward movement in said hollow portion.

6. An automatic train pipe connecter comprising in combination, a coupling head having an opening, a supporting member connected to said head and extending rearwardly thereof and having a hollow front portion, said hollow portion having one of the lateral side walls thereof provided with an opening into which a conduit is adapted to be inserted, said lateral side wall adjacent said opening having a seat formed therein, a conduit rotatably mounted in said opening in the head and in said hollow portion of said member and having a portion extending laterally out of said opening, said conduit being rotatable into engagement with said seat to thereby lock the same against rearward movement in said hollow portion.

7. An automatic train pipe connecter comprising in combination, a coupling head having an opening, a supporting member connected to said head and extending rearwardly thereof and having a hollow front portion, said hollow portion having an opening on one side thereof into which a conduit is adapted to be inserted, one wall of said hollow portion having a seat formed therein, a conduit rotatably mounted in said opening in the head and in said hollow portion of said member, said conduit being rotatable into engagement with said seat to thereby lock the same against rearward movement in said hollow portion and manually releasable means for holding said conduit in said seat.

8. An automatic train pipe connecter comprising in combination, a coupling head having an opening, a member connected to said head and extending rearwardly thereof and having a hollow portion, said hollow portion having an opening on one side thereof, a conduit arranged in said hollow portion and in said opening in the head, the rear part of said conduit extending laterally out of said hollow portion, said conduit being rotatable in said hollow portion, one wall of said hollow portion having a seat formed therein into which said conduit is received upon rotation of the same in said hollow portion, whereby said conduit is locked against rearward movement relative to the head.

9. An automatic train pipe connecter comprising in combination, a coupling head having an opening, a hollow member connected to said head and extending rearwardly thereof, said hollow member having on one side an opening into which a conduit may be inserted, a conduit mounted in said opening in the head and extending rearwardly into said hollow portion and laterally thereof out of the opening therein, said hollow member on one side having its wall shaped to provide a seat for the laterally extending portion of said conduit, whereby the conduit is locked against rearward movement.

10. A structure as specified in claim 9 having means for holding said conduit in said seat.

11. A member for supporting an automatic train pipe connecter head and conduit, said member having a hollow front portion adapted to be connected to a coupling head and to receive a conduit, said hollow portion having one of the lateral side walls thereof provided with an opening into which said conduit may be inserted, said lateral side wall adjacent said opening being shaped to form a seat for receiving the conduit and holding the same against rearward movement in said hollow portion.

12. In combination, a supporting member for an automatic train pipe coupling head, said member having a hollow front portion, one of the lateral walls of which is provided with an opening into which a conduit is adapted to be inserted, said lateral side wall adjacent said opening having a seat formed therein, a conduit rotatably mounted in said opening in the head and in said hollow portion of said member and having a portion extending laterally out of said opening, said conduit being rotatable into engagement with said seat to thereby lock the same against rearward movement in said hollow portion.

13. In combination, a supporting member for an automatic train pipe connecter head, said member having a hollow front portion, said hollow portion having on opening on one side thereof into which a conduit is adapted to be inserted, one wall of said hollow portion having a seat formed therein, a conduit rotatably mounted in said opening in the head and in said hollow portion of said member, said conduit being rotatable into engagement with said seat to thereby lock the same against rearward movement in said hollow portion and manually releasable means for holding said conduit in said seat.

14. In combination, a supporting member for an automatic train pipe connecter head, said member having a hollow front portion, said hollow portion having an opening on one side thereof into which a conduit is adapted to be inserted, a conduit rotatably mounted in said hollow portion of said member, said conduit extending laterally out of said opening, and cam means formed on and rigid with said member for forcing said conduit forwardly and holding the same in position when the conduit is rotated relative to said member.

In testimony whereof I hereunto affix my signature.

JOSEPH ROBINSON.